United States Patent
Choi et al.

(10) Patent No.: US 7,086,498 B2
(45) Date of Patent: Aug. 8, 2006

(54) NOISE ATTENUATION DEVICE FOR A VEHICLE EXHAUST SYSTEM

(75) Inventors: Michael Choi, Garden City, MI (US); Amir Keyvanmanesh, Leamington Spa (GB)

(73) Assignee: Ford Global Technologies, LLC, Dearborn, MI (US)

( * ) Notice: Subject to any disclaimer, the term of this patent is extended or adjusted under 35 U.S.C. 154(b) by 303 days.

(21) Appl. No.: 10/647,357

(22) Filed: Aug. 25, 2003

(65) Prior Publication Data

US 2005/0045418 A1    Mar. 3, 2005

(51) Int. Cl.
*F01N 1/08* (2006.01)
*F02M 35/12* (2006.01)
*F02M 35/16* (2006.01)

(52) U.S. Cl. ............ 181/270; 123/184.21; 123/184.53; 123/590

(58) Field of Classification Search ................ 181/270, 181/279, 280, 281, 264
See application file for complete search history.

(56) References Cited

U.S. PATENT DOCUMENTS

| 2,708,006 | A | * | 5/1955 | Hans ........................... 181/225 |
| 3,177,972 | A | * | 4/1965 | Wirt ............................ 181/268 |
| 3,365,863 | A | * | 1/1968 | Greipel et al. ................ 96/386 |
| 3,458,297 | A | * | 7/1969 | Anderson ................... 48/189.4 |
| 3,700,069 | A | | 10/1972 | Rausch et al. |
| 3,913,703 | A | | 10/1975 | Parker |
| 3,948,348 | A | | 4/1976 | Bychinsky |
| 3,948,349 | A | | 4/1976 | Bychinsky |
| 3,966,015 | A | | 6/1976 | Bychinsky |
| 4,167,986 | A | * | 9/1979 | Conway ...................... 181/224 |
| 4,167,987 | A | * | 9/1979 | Turner ......................... 181/235 |
| 4,274,386 | A | * | 6/1981 | Reyes ......................... 123/591 |
| 4,333,441 | A | * | 6/1982 | Still et al. .................. 48/189.4 |
| 4,362,223 | A | * | 12/1982 | Meier ......................... 181/206 |
| 4,672,940 | A | * | 6/1987 | Nakayama et al. ......... 123/590 |
| 4,683,978 | A | | 8/1987 | Venter |
| 5,113,838 | A | * | 5/1992 | Kim ........................... 123/592 |
| D355,420 | S | * | 2/1995 | Cho ............................ D15/5 |
| 5,595,157 | A | * | 1/1997 | Siew et al. .................. 123/306 |
| 5,722,357 | A | | 3/1998 | Choi |
| 5,758,614 | A | | 6/1998 | Choi |
| 5,916,134 | A | * | 6/1999 | Yang et al. .................. 60/299 |
| 5,924,398 | A | | 7/1999 | Choi |
| 5,947,081 | A | * | 9/1999 | Kim ........................... 123/306 |
| 5,952,624 | A | * | 9/1999 | Hornback et al. ........... 181/255 |

(Continued)

FOREIGN PATENT DOCUMENTS

JP    01019163 A  *  1/1989

OTHER PUBLICATIONS

"Welcome to MedallionFX"; www.medallionfx.com.

(Continued)

*Primary Examiner*—Edgardo San Martin
(74) *Attorney, Agent, or Firm*—Allah J. Lippa; Alleman Hall McCoy Russell & Tuttle LLP

(57) ABSTRACT

A noise attenuation device for a vehicle exhaust system is provided. The device includes an exhaust pipe having a passageway for receiving exhaust gas pulses from an engine. The device further includes a plurality of vanes extending from an inner surface of the passageway and spaced apart from one another and disposed upstream of a discontinuity in the exhaust pipe. The vanes reduce turbulence in the exhaust gas pulses flowing past the vanes to reduce noise at the exhaust pipe discontinuity.

25 Claims, 2 Drawing Sheets

U.S. PATENT DOCUMENTS

| | | | | |
|---|---|---|---|---|
| 5,970,963 | A * | 10/1999 | Nakase et al. | 123/590 |
| 6,035,964 | A * | 3/2000 | Lange | 181/224 |
| 6,158,412 | A * | 12/2000 | Kim | 123/306 |
| 6,267,006 | B1 * | 7/2001 | Bugli et al. | 73/118.2 |
| 6,439,540 | B1 * | 8/2002 | Tse | 251/127 |
| 6,536,420 | B1 * | 3/2003 | Cheng | 123/590 |
| 6,550,446 | B1 * | 4/2003 | Robley, Jr. | 123/306 |
| 6,796,296 | B1 * | 9/2004 | Kim | 123/590 |
| 6,840,212 | B1 * | 1/2005 | Kim | 123/306 |
| 6,901,907 | B1 * | 6/2005 | Wijaya | 123/306 |
| 6,928,979 | B1 * | 8/2005 | Chen | 123/306 |
| 2003/0140892 | A1 * | 7/2003 | Kim | 123/306 |
| 2004/0211389 | A1 * | 10/2004 | DeLisle | 123/306 |

OTHER PUBLICATIONS

"The Turbo Exhaust Tube"; http://www.spiralmax.com/tet.htm.

* cited by examiner

NOISE ATTENUATION DEVICE FOR A VEHICLE EXHAUST SYSTEM

FIELD OF THE INVENTION

The field of the present invention is noise attenuation devices for suppressing noise in vehicle exhaust systems.

BACKGROUND OF INVENTION

Internal combustion engines have exhaust manifolds coupled to exhaust pipes. The exhaust pipes generally have several discontinuities to allow the exhaust pipe to be routed around various components on the underbody of a vehicle. A discontinuity is defined as any variation in the dimensions or shape of an exhaust system which affects the flow path of exhaust gases. For example, a discontinuity can be: (i) a bend in an exhaust pipe, (ii) an irregular flow path surface at a coupling between two exhaust pipe sections, (iii) a change in the diameter of an exhaust pipe section, (iv) an emission control device restricting flow therethrough, or (v) any other flow restriction in the exhaust pipe portion.

The inventors herein have recognized that undesirable impingement noise is generated by the exhaust gas pulses contacting discontinuities in conventional exhaust systems. Further, the inventors herein have recognized that it would be desirable to utilize a noise attenuation device upstream of an exhaust system discontinuity to reduce impingement noise in an exhaust system.

SUMMARY OF INVENTION

A noise attenuation device for a vehicle exhaust system in accordance with a first aspect of the present invention is provided. The noise attenuation device includes an exhaust pipe having a passageway for receiving exhaust gas pulses from an engine. The device further includes a plurality of vanes extending from an inner surface of the exhaust pipe and spaced apart from one another and disposed upstream of a discontinuity of the exhaust pipe. The vanes reduce turbulence in the exhaust gas pulses flowing past the vanes to reduce noise generated at the exhaust pipe discontinuity.

An exhaust system for an engine in accordance with a second aspect of the present invention is also provided. The system includes an exhaust pipe receiving exhaust gas pulses from the engine. The system further includes an air diffuser disposed upstream of a discontinuity of the exhaust pipe. The diffuser has an outer wall defining an internal bore communicating with the exhaust pipe. The diffuser further includes a plurality of vanes extending from the wall and spaced apart from one another. The vanes reduce turbulence in the exhaust gas pulses flowing past the vanes to reduce noise at the exhaust pipe discontinuity.

A method for attenuating noise in an exhaust system of an engine in accordance with a third aspect of the present invention is also provided. The method includes flowing exhaust gas pulses from the engine through a portion of an exhaust pipe. The method further includes flowing the exhaust gas pulses through a plurality of vanes extending from an inner surface of the exhaust pipe to reduce turbulence in the exhaust gases flowing past the vanes to reduce noise at a downstream discontinuity in the exhaust pipe.

The inventive noise attenuation device and exhaust system provides a substantial advantage over known systems. In particular, the inventive device and system reduces impingement noise generated by exhaust gas pulses contacting a discontinuity in an exhaust system. The inventive system and method reduces turbulence upstream of a discontinuity in the exhaust system to reduce impingement noise generated by exhaust gas-pulses contacting the discontinuity in the exhaust system.

DETAILED DESCRIPTION OF THE EMBODIMENTS

Figure 1:
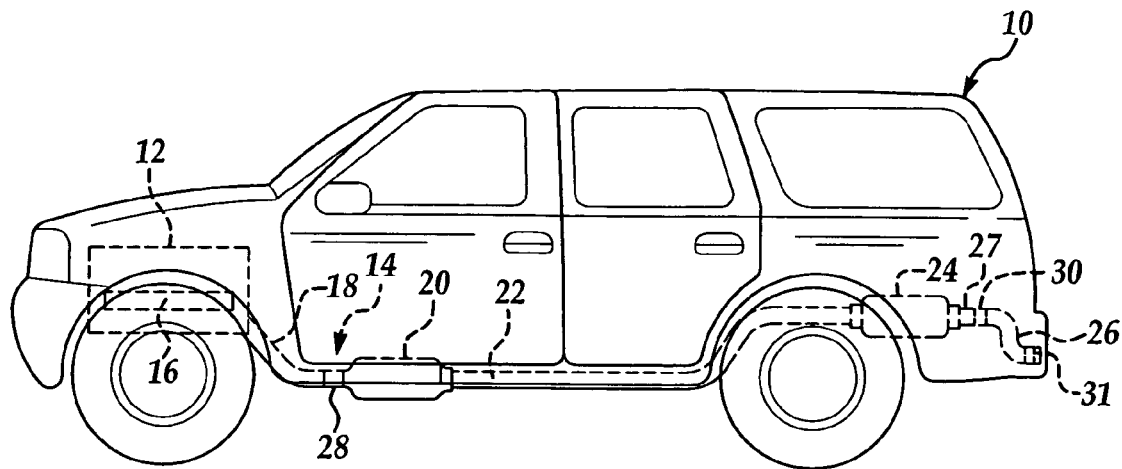
FIG. 1 is a schematic of a vehicle having an engine coupled to an exhaust system.

Referring now to the drawings, like reference numerals are used to identify identical components in the various views. Referring to FIG. 1, an automotive vehicle 10 is shown. Vehicle 10 includes an internal combustion engine 12 coupled to an exhaust system 14 in accordance with the present invention.

Engine 12 includes an exhaust manifold 16 coupled to exhaust system 14. As will explained in greater detail below, the inventors herein have recognized that exhaust gas pulses propagating to a discontinuity in exhaust system 14 can generate undesirable impingement noise. Accordingly, the present invention is directed to noise attenuation devices, described below, that reduce the impingement noise in exhaust system 14.

Exhaust system 14 includes an inlet exhaust pipe section 18, a catalytic converter 20, an intermediate exhaust pipe section 22, a muffler 24, and outlet exhaust pipe sections 26, 27, and noise attenuation devices 28, 30, 31. As will be explained below, devices 28, 30 may be disposed upstream of discontinuities in exhaust system 14 to reduce impingement noise generated at the discontinuities.

Figure 2:
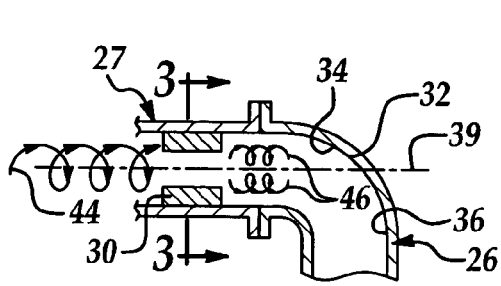
FIG. 2 is a sectional view of a first embodiment of a noise attenuation device in accordance with the present invention disposed upstream of a bend in an exhaust system of FIG. 1.
Figure 3:
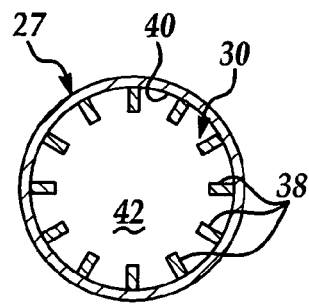
FIG. 3 is an enlarged cross-sectional view of the noise attenuation device of FIG. 2.

Referring to FIGS. 2 and 3, a noise attenuation device 30 is provided for reducing impingement noise in exhaust system 14. As shown, device 30 may be disposed upstream of a bend 32 in outlet exhaust pipe section 26. The bend 32 may be approximately 90° and provides an impingement surface between points 34 and 36 where exhaust gas pulses may generate impingement noise.

Referring to FIG. 3, device 30 may include a plurality of vanes 38 extending inwardly from a tubular wall 40 of exhaust pipe section 27 into an aperture 42 defined by wall 40. The plurality of vanes 38 may be formed of the same metal as section 27. As shown, vanes 38 may extend from a predetermined axial position on axis 39 a predetermined axial distance and extend inwardly from wall 40 a predetermined distance into aperture 42. The number, shape, axial length, inwardly extending distance, thickness, and orientation of the vanes 38 may be varied based on desired noise dampening characteristics of device 30.

In an alternate embodiment (not shown), noise attenuation device 30 can have vanes formed as punched out tabs of exhaust pipe section 27. Further, a collar can be disposed around exhaust pipe section 27 covering the holes in section 27 proximate the punched out tabs. In another alternate embodiment, device 30 could be formed as a ring of metal having punched out tabs that form vanes 38. The ring could be affixed within an exhaust pipe section to form device 30.

Referring again to FIGS. 2 and 3, the noise dampening characteristics of device 30 will now be explained. As shown, an exhaust gas pulse 44 may propagate down section 27 in a generally vortex pattern to vanes 38. When the relatively large exhaust gas pulse 44 passes by vanes 38, vanes 38 disperse the exhaust gas pulse 44 into a plurality of exhaust gas pulses 46 spread out over a wider area in exhaust gas pipe section 26. Thus, the exhaust gas pulses that contact bend 32 are dispersed over a wider area of section 26 which reduces the amount of noise generated at bend 32 by the exhaust gas pulses. Further, adjacent ones of vanes 38 may form downstream exhaust gas pulses with vortex flow patterns that rotate in opposite directions with respect to one another. The counter-rotating vortexes can interact with each other to reduce turbulence in the exhaust gases prior to the exhaust gases contacting bend 32. The reduced turbulence reduces the noise generated by the exhaust gases contacting bend 32.

Figure 4:
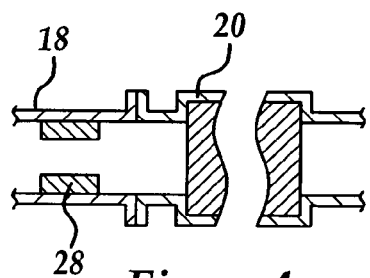
FIG. 4 is a sectional view of a first embodiment of the noise attenuation device disposed upstream of a catalyst shown in FIG. 1.

Referring to FIGS. 1 and 4, a noise attenuation device 28 may also be utilized upstream of catalytic converter 20 or other emission control devices such as a NOx trap or a diesel particulate filter. As shown, device 28 may have an identical structure as device 30. Device 28 is placed upstream of catalytic converter 20 to decrease the magnitude of the noise generated by exhaust gas pulses contacting the front surface (not shown) of converter 20. A further advantage of positioning device 28 upstream of converter 20 is that the operating efficiency of converter 20 can be increased. In particular, device 28 disperses the exhaust gas vortexes from engine 12 over wider front surface area of converter 20—which allows for increased catalyst efficiency in reducing nitrogen oxides (NOx) and oxidizing hydrocarbons (HC) and carbon monoxide (CO)—as compared to an exhaust system not having device 28. Further, device 28 could increase the operating efficiency of other emission control devices such as NOx traps and diesel particulate filters by more evenly distributing the exhaust gases (and exhaust gas constituents contained therein) on the internal catalytic surfaces and particular trapping surfaces of the NOx traps and particulate filters.

Referring to FIGS. 5–17, several alternate embodiments of noise-attenuating devices or air-diffusers are shown. Each embodiment may be disposed upstream of a discontinuity in exhaust system 14 to reduce impingement noise generated therein. Each embodiment may be constructed from steel, high temperature plastic, cast aluminum, die-cast aluminum, or ceramic. Further, the number, shape, axial length, inwardly extending distance, thickness, and orientation of the vanes of each embodiment may be varied based on desired flow characteristics and noise damping characteristics the devices.

Figure 5:
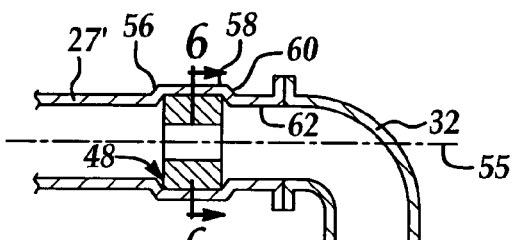
FIG. 5 is a sectional view of a second embodiment of a noise attenuation device in accordance with the present invention disposed upstream of a bend in an exhaust system of FIG. 4.
Figure 7:
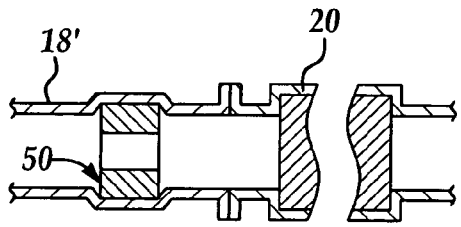
FIG. 7 is a sectional view of the second embodiment of the noise attenuation device disposed upstream of a catalyst.

Referring to FIGS. 5 and 7, a second embodiment of the present invention is shown in noise attenuation devices 48, 50. A difference between devices 48, 50 and device 30 is that devices 48, 50 are separate components that can be affixed within exhaust system 14 instead of being formed integral within exhaust pipe sections of exhaust system 14. Referring to FIG. 5, device 48 may be utilized to reduce turbulence in exhaust gases upstream of bend 32 to reduce the impingement noise generated by exhaust gases contacting bend 32. Similarly, referring to FIG. 7, device 50 may be utilized to reduce turbulence in exhaust gases upstream of converter 20 to reduce impingement noise generated by exhaust gases contacting converter 20.

Figure 6:
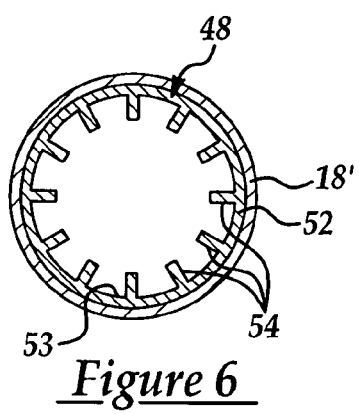
FIG. 6 is an enlarged cross-sectional view of the second embodiment of the noise attenuation device disposed upstream of a bend in an exhaust system of FIG. 5.

Referring to FIGS. 5 and 6, device 48 may include a tubular wall 52 and a plurality of vanes 52 extending inwardly from wall 52 a predetermined distance into an aperture 53. Further, vanes 54 may extend from a predetermined axial position on axis 55 a predetermined axial distance. For example, each of vanes 52 may extend inwardly 10 mm from wall 52 and have a thickness of 1.5 mm and an axial length of 10 mm. Further, vanes 52 may be spaced about an inner circumference of wall 52 equidistant from one another. For example, vanes 52 may be spaced 10 mm from each other about the inner circumference of wall 52.

As shown, tubular exhaust pipe section 27' may have an inner diameter suitable for allowing device 48 to be press-fit within the opening defined by the section 27'. Section 27' may include formed portions 56, 58, 60—produced by a conventional roll-forming process—for affixing device 48 in exhaust system 14. In particular, portions 56, 58 can initially be formed using the conventional roll-forming process. Next, device 48 may be press-fit within portion 58. Next, portions 60, 62 can be formed using the conventional roll-forming process to affix device 48 within exhaust pipe section 27'.

Figure 8:
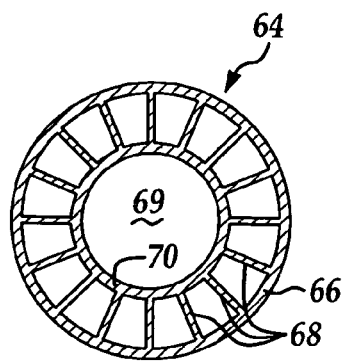
FIG. 8 is a cross-sectional view of a third embodiment of a noise attenuation device in accordance with the present invention.

Referring to FIG. 8, a cross-sectional view of a third embodiment of the present invention is shown as noise attenuation device 64. Device 64 may be disposed upstream of a discontinuity in exhaust system 14 to reduce impingement noise in the frequency range of 1000–6000 Hz. As shown, device 64 may include a tubular wall 66 and a plurality of vanes 68 extending radially inwardly from wall 66 into an aperture 69 defined by wall 66. Further, vanes 68 may extend inwardly a predetermined distance and be affixed to an internal ring 70. Further, wall 66, vanes 68, and ring 70 may extend from a predetermined axial position a predetermined axial distance. Device 64 may be press-fit within exhaust system 14 as described above with respect to devices 48, 50. In an alternate embodiment (not shown), vanes 68 could be formed integrally within an exhaust pipe section instead of being attached to wall 66.

Figure 9:
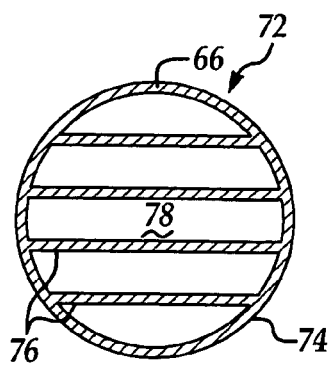
FIG. 9 is a cross-sectional view of a fourth embodiment of a noise attenuation device in accordance with the present invention.

Referring to FIG. 9, a cross-sectional view of a fourth embodiment of the present invention is shown as noise attenuation device 72. Device 72 may be disposed upstream of a discontinuity in exhaust system 14 to reduce impingement noise in the frequency range of 1000–6000 Hz. As shown, device 72 may include a tubular wall 74 having a plurality of vanes 76 extending across an aperture 78 defined by wall 74. Further, vanes 76 may be disposed parallel to one another across aperture 78. Device 72 may be press-fit within exhaust system 14 as described above with respect to devices 48, 50. In an alternate embodiment (not shown), vanes 78 could be directly integrally formed within an exhaust pipe section instead of being attached to tubular wall 74.

Figure 10:
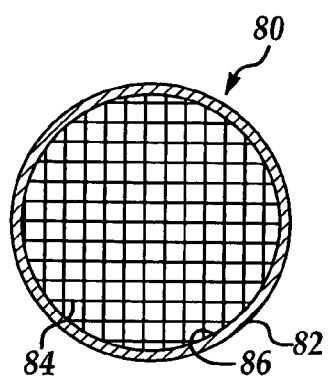
FIG. 10 is a cross-sectional view of a fifth embodiment of a noise attenuation device in accordance with the present invention.

Referring to FIG. 10, a cross-sectional view of a fifth embodiment of the present invention is shown as noise attenuation device 80. Device 80 may be disposed upstream of a discontinuity in exhaust system 14 to reduce impingement noise in the frequency range of 1000–6000 Hz. Device 80 may include a tubular wall 82 and a wire mesh 84 extending across an aperture 86 defined by wall 82. Wire mesh 84 may be bonded to wall 82 using a high temperature adhesive or using other attachment means known to those skilled in the art. Device 80 may be press-fit within exhaust system 14 as described above with respect to devices 48, 50. In an alternate embodiment (not shown), wire mesh 84 could be directly coupled to an interior surface of an exhaust pipe section instead of being attached to tubular wall 82.

Figure 11:
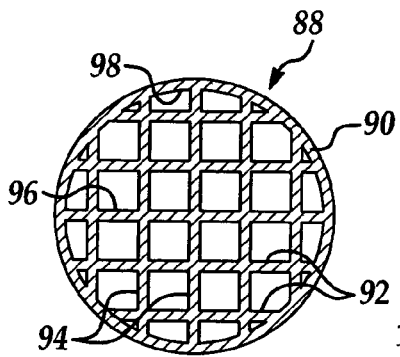
FIG. 11 is a cross-sectional view of a sixth embodiment of a noise attenuation device in accordance with the present invention.

Referring to FIG. 11, a cross-sectional view of a sixth embodiment of the present invention is shown as noise attenuation device 88. Device 88 may be disposed upstream of a discontinuity in exhaust system 14 to reduce impingement noise in the frequency range of 1000–6000 Hz. Device 88 may include a tubular wall 90 and a plurality of horizontal vanes 92 and a plurality of vertical vanes 94 forming a honeycomb-shaped vane structure 96 within an aperture 98 defined by wall 90. Device 88 may be press-fit within exhaust system 14 as described above with respect to devices 48, 50. In an alternate embodiment (not shown), honeycomb-shaped vane structure 96 could be integrally formed within an exhaust pipe section.

Figure 12:
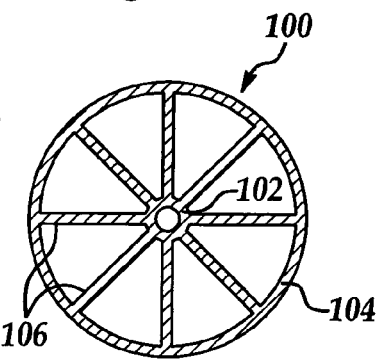
FIG. 12 is a cross-sectional view of a seventh embodiment of a noise attenuation device in accordance with the present invention.

Referring to FIG. 12, a cross-sectional view of a seventh embodiment of the present invention is shown as noise attenuation device 100. Device 100 may be disposed upstream of a discontinuity in exhaust system 14 to reduce impingement noise in a narrow-band frequency range. For example, device 100 could be tuned to attenuate noise in the 1000–2000 Hz range, 2000–3000 Hz range, 3000–4000 Hz range, or 4000–5000 Hz range depending on the diameter of an inner ring 102. As shown, device 100 may include a tubular wall 104 and a plurality of vanes 106 extending radially inwardly from wall 104 a predetermined distance to inner ring 102. As shown, inner ring 102 has a diameter substantially smaller than the diameter of wall 104. Device 100 may be press-fit within exhaust system 14 as described above with respect to devices 48, 50.

Figure 13:
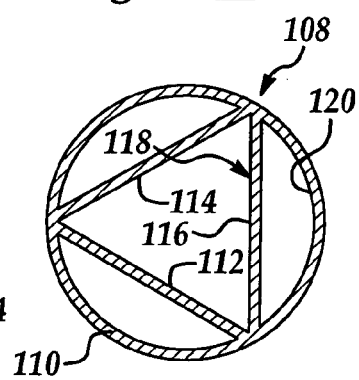
FIG. 13 is a cross-sectional view of an eighth embodiment of a noise attenuation device in accordance with the present invention.

Referring to FIG. 13, a cross-sectional view of an eighth embodiment of the present invention is shown as noise attenuation device 108. Device 108 may be disposed upstream of a discontinuity in exhaust system 14 to reduce impingement noise in the frequency range of 1000–6000 Hz. Device 108 may include a tubular wall 110 and vanes 112, 114, 116 which form a triangular-shaped vane structure 118 within aperture 120 defined by wall 110. Device 108 may be press-fit within exhaust system 14 as described above with respect to devices 48, 50. In an alternate embodiment (not shown), triangular-shaped vane structure 118 could be integrally formed within an exhaust pipe section.

Figure 14:
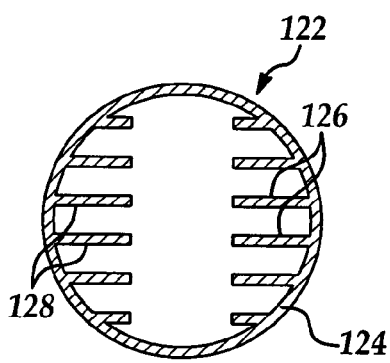
FIG. 14 is a cross-sectional view of a ninth embodiment of a noise attenuation device in accordance with the present invention.

Referring to FIG. 14, a cross-sectional view of an ninth embodiment of the present invention is shown as noise attenuation device 122. Device 122 may be disposed upstream of a discontinuity in exhaust system 14 to reduce impingement noise in the frequency range of 1000–6000 Hz. Device 122 may include a tubular wall 124 and a first set of vanes 126 extending from a first portion of wall 124 inwardly in a first direction a predetermined distance. Each of the first set of vanes 126 being parallel to one another. Device 122 may further include a second set of vanes 128 extending from wall 122 inwardly in a second direction, opposite the first direction, a predetermined distance. Each of the second set of vanes 128 being parallel to one another. Device 122 may be press-fit within exhaust system 14 as described above with respect to devices 48, 50. In an alternate embodiment (not shown), first and second set of vanes 126, 128 could be integrally formed within an exhaust pipe section.

Figure 15:
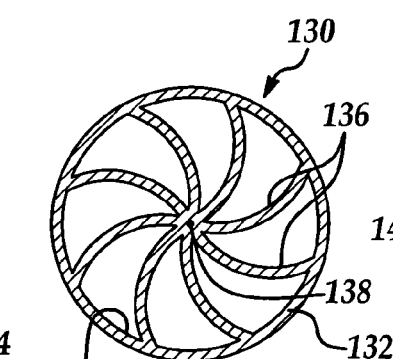
FIG. 15 is a cross-sectional view of a tenth embodiment of a noise attenuation device in accordance with the present invention.

Referring to FIG. 15, a cross-sectional view of a tenth embodiment of the present invention is shown as noise attenuation device 130. Device 130 may be disposed upstream of a discontinuity in exhaust system 14 to reduce impingement noise in the frequency range of 1000–6000 Hz. Device 130 may include a tubular wall 132 defining an aperture 134. Device 130 may further include a plurality of S-shaped vanes 136 disposed within aperture 134 and coupled at each end to tubular wall 132. Each of the S-shaped vanes 136 are coupled together at a midpoint 138 which is located centrally in aperture 134. Device 130 may be press-fit within exhaust system 14 as described above with respect to devices 48, 50. In an alternate embodiment (not shown), vanes 136 could be integrally formed within an exhaust pipe section.

Figure 16:
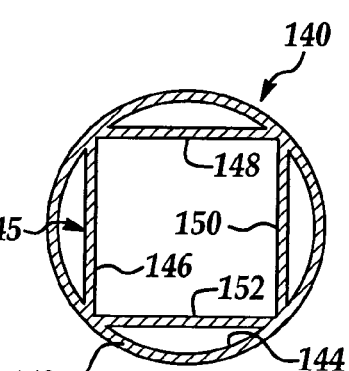
FIG. 16 is a cross-sectional view of an eleventh embodiment of a noise attenuation device in accordance with the present invention.

Referring to FIG. 16, a cross-sectional view of an eleventh embodiment of the present invention is shown as noise attenuation device 140. Device 140 may be disposed upstream of a discontinuity in exhaust system 14 to reduce impingement noise in the frequency range of 1000–6000 Hz. Device 14 may include a tubular wall 142 defining an aperture 144. Device 140 may further include a rectangular vane structure 145 comprised of vanes 146, 148, 150, 152 disposed within aperture 144 and coupled to wall 142. Device 140 may be press-fit within exhaust system 14 as described above with respect to devices 48, 50. In an alternate embodiment (not shown), rectangular vane structure 145 could be integrally formed within an exhaust pipe section.

Figure 17:
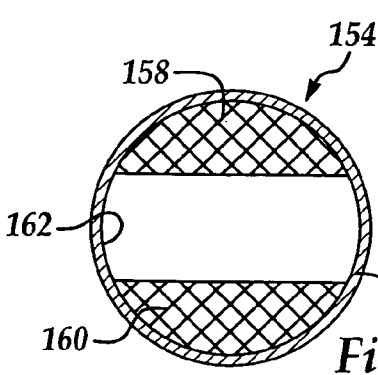
FIG. 17 is a cross-sectional view of a twelfth embodiment of a noise attenuation device in accordance with the present invention.

Referring to FIG. 17, a cross-sectional view of a twelfth embodiment of the present invention is shown as noise attenuation device 154. Device 154 may be disposed upstream of a discontinuity in exhaust system 14 to reduce impingement noise in the frequency range of 1000–6000 Hz. Device 154 may include a tubular wall 156 and a first and second wire meshes 158, 160 disposed in an aperture 162 defined by wall 156. Wire mesh 158 may cover a first portion of aperture 162 and wire mesh 160 may cover a second portion of aperture 162 opposite the first portion of aperture 162. Wire meshes 158, 160 may be constructed from steel and bonded to wall 156 using a high temperature adhesive or using other attachment means known to those skilled in the art. Device 154 may be press-fit within exhaust system 14 as described above with respect to devices 48, 50. In an alternate embodiment (not shown), wire meshes 158, 160 could be directly coupled to an interior surface of an exhaust pipe section instead of being attached to tubular wall 156.

Figure 18:
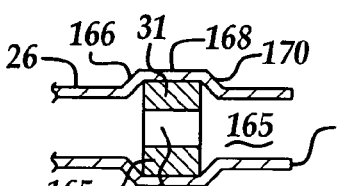
FIG. 18 is a cross-sectional view of a noise attenuation device disposed upstream of an outlet of a straight-ended exhaust pipe.
Figure 19:
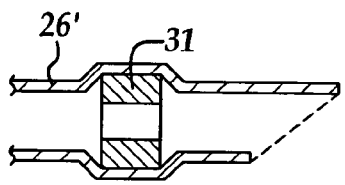
FIG. 19 is a cross-sectional view of a noise attenuation device disposed upstream of an outlet of an exhaust pipe having a tapered end.

Referring to FIGS. 18 and 19, another aspect of the present invention for reducing flow path noise will be discussed. In particular, noise attenuation devices 31 is disclosed for reducing flow path noise generated proximate an outlet of an exhaust pipe. FIG. 18 illustrated device 31 being used to reduce noise at an outlet of an exhaust pipe section 26 having a straight end. FIG. 19 illustrates device 31 being used to reduce noise at an outlet of an exhaust pipe section 26' having a tapered end.

Referring to FIG. 18, device 31 is disposed in exhaust pipe section 26 upstream of an outlet 165 of section 26. Device 31 reduces turbulence downstream of device 31 so that the amount of exhaust gas vortexes wrapping around edge 164 and contacting an outer surface of section 26 is reduced. As a result, flow path noise is reduced. Device 31 may have a tubular wall (not shown) and a plurality of vanes 165 which extend inwardly from the wall a predetermined distance into an aperture 172. The design of device 31 and the materials used to form device 31 may be substantially similar to those used in device 48 discussed above.

As shown in FIG. 18, exhaust pipe section 26 may have an inner diameter suitable for allowing device 31 to be press-fit within the opening defined by the section 26. Section 26 may include formed portions 166, 168, 170—produced by a conventional roll-forming process—for press-fitting device 31 in exhaust system 14, similarly as discussed above with device 48. Further, device 31 may be disposed a distance (D) (e.g., D=20 mm) upstream of an edge 164 of exhaust pipe section 26.

It should be further understood that any of the noise attenuation devices described above in FIGS. 2–17 could alternately be used in section 26 and section 26', instead of device 31.

The inventive noise attenuation device and exhaust system described herein provide a substantial advantage over known systems. In particular, the inventive device and system can reduce impingement noise generated at any discontinuity in a vehicle exhaust system and reduce flow path noise generated at an outlet of an exhaust pipe.

We claim:

1. A noise attenuation device for a vehicle exhaust system, comprising:
   an exhaust pipe having a passageway for receiving exhaust gas pulses from an engine, said pipe having a discontinuity;
   a plurality of vanes extending from an inner surface of said exhaust pipe and spaced apart from one another and disposed upstream of said discontinuity of said exhaust pipe and substantially proximate to said discontinuity, said vanes being oriented generally parallel to a direction of flow of said exhaust gas pulses and configured to reduce turbulence in said exhaust gas pulses flowing past said vanes to reduce noise generated at said exhaust pipe discontinuity; and
   said passageway being substantially unobstructed in a proximity upstream of said vanes so that said flow is substantially unobstructed before impacting said vanes.

2. The noise attenuation device of claim 1 wherein said vanes comprise metal vanes formed as punched out tabs in a ring of metal which is fitted within the passageway.

3. The noise attenuation device of claim 1 wherein said vanes comprise metal vanes provided by stamped out tabs of said exhaust pipe and wherein a collar surrounds said exhaust pipe adjacent said vanes.

4. The noise attenuation device of claim 1 wherein said plurality of vanes comprises one of plastic vanes, ceramic vanes, die-cast aluminum vanes, and cast-aluminum vanes.

5. The noise attenuation device of claim 1 further comprising an inner ring disposed in said passageway, said plurality of vanes extending from an inner surface of said exhaust pipe to said inner ring.

6. The noise attenuation device of claim 1 wherein said plurality of vanes form a honeycomb-shaped vane structure in said passageway.

7. The noise attenuation device of claim 1 wherein each of said plurality of vanes extends across said passageway, said plurality of vanes being generally parallel to one another.

8. The noise attenuation device of claim 1 wherein said plurality of vanes form one of a triangular vane structure and a rectangular vane structure in said passageway.

9. The noise attenuation device of claim 1 wherein said plurality of vanes comprise a wire mesh in said passageway.

10. The noise attenuation device of claim 1 wherein said plurality of vanes are disposed circumferentially around said passageway at a predetermined axial position in said passageway.

11. The noise attenuation device of claim 10 wherein each of said plurality of vanes extend a predetermined axial distance from said predetermined axial position in said passageway.

12. The noise attenuation device of claim 1 wherein said discontinuity changes a flow characteristic in said passageway.

13. An exhaust system for an internal combustion engine, comprising:
   an exhaust pipe receiving exhaust gas pulses from the engine, said pipe having a discontinuity; and,
   an air diffuser disposed upstream of said discontinuity of said exhaust pipe and substantially proximate to said discontinuity, said diffuser having an outer wall defining an internal bore communicating with said exhaust pipe, said diffuser further including a plurality of vanes extending from said wall and spaced apart from one another, said vanes being oriented generally parallel to a direction of flow of said exhaust gas pulses and configured to reduce turbulence in said exhaust gas pulses flowing past said vanes to reduce noise at said exhaust pipe discontinuity, where said exhaust pipe is substantially unobstructed in a proximity upstream of said vanes so that said flow is substantially unobstructed before impacting said vanes.

14. The exhaust system of claim 13 wherein said discontinuity changes a flow characteristic in said exhaust pipe.

15. The exhaust system of claim 13 wherein said discontinuity comprises a bend in said exhaust pipe.

16. The exhaust system of claim 13 wherein said discontinuity comprises a coupling location between two sections of said exhaust pipe.

17. The exhaust system of claim 13 wherein said discontinuity comprises a coupling between an exhaust pipe portion and an exhaust catalyst.

18. The exhaust system of claim 13 wherein said discontinuity comprises a region where a diameter of said exhaust pipe is generally increasing or decreasing.

19. The exhaust system of claim 13 wherein said diffuser comprises one of a plastic diffuser, a ceramic diffuser, a die-cast diffuser, and a cast-aluminum diffuser.

20. The exhaust system of claim 13 wherein said vanes of said diffuser comprise a wire mesh.

21. The exhaust system of claim 13 wherein said air diffuser further includes an inner ring, said plurality of vanes extending from said diffuser wall to said inner ring.

22. The exhaust system of claim 13 wherein said plurality of diffuser vanes form a honeycomb-shaped vane structure in said bore.

23. The exhaust system of claim 13 wherein each of said plurality of diffuser vanes extends across said bore, each of said vanes being generally parallel to one another.

24. The exhaust system of claim 13 wherein said plurality of diffuser vanes form one of a triangular vane structure and a rectangular vane structure in said bore.

25. The exhaust system of claim 13 wherein said plurality of vanes of said diffuser are disposed circumferentially around said wall equidistant from adjacent vanes.

* * * * *